United States Patent [19]

Papistok et al.

[11] 4,385,855
[45] May 31, 1983

[54] HOBBING MACHINE

[75] Inventors: Heinz Papistok, Karl-Marx-Stadt; Herbert Reuter, Weissbach, both of German Democratic Rep.

[73] Assignee: Veb Werkzeugmaschinenkombinat"7.Oktober" Berlin, Berlin, German Democratic Rep.

[21] Appl. No.: 201,318

[22] Filed: Oct. 27, 1980

[30] Foreign Application Priority Data

Oct. 29, 1979 [DD] German Democratic Rep. ... 216518

[51] Int. Cl.³ .............................................. B23F 5/22
[52] U.S. Cl. ........................................... 409/24; 409/1
[58] Field of Search ...................... 409/11, 12, 10, 15, 409/14, 16, 2, 3, 19, 21, 13, 17, 18, 20, 22, 23, 24

[56] References Cited

U.S. PATENT DOCUMENTS 3,107,579 10/1963 Budnick et al. ........................ 409/21
4,284,376 8/1981 Papistok et al. ................... 409/11 X Primary Examiner—Z. R. Bilinsky
Attorney, Agent, or Firm—Michael J. Striker

[57] ABSTRACT

The hobbing machine is formed with a work table housing enclosing a work table rotatable about a workpiece axis, and indexing gear system for driving the work table; a stationary stand supports for movement parallel to the work axis a hob carriage, the latter supporting a swivel head and a hob slide movable transversely to the work axis and carrying a hob spindle; a hob driving gear system, a separate feed driving system, a differential and differential change gears are arranged in the hob carriage whereas indexing change gears are arranged in the work table housing and coupled to the differential in the hob carriage.

3 Claims, 2 Drawing Figures

HOBBING MACHINE

BACKGROUND OF THE INVENTION

The present invention relates in general to a hobbing machine for manufacturing spur- and worm gears, and in particular to a hobbing machine of the type which has a tool-supporting stand on which is arranged a hob carriage movable parallel to the axis of the workpiece and supporting a swivel head which in turn supports a slide movable in tangential direction relative to the workpiece; the machine further includes a differential gear system which is coupled with a hob driving gear system.

Prior-art hobbing machines for manufacturing spur gears and worm gears which have a separate feed drive branched off for driving both the axial and tangential feed drive elements, are known, the feed drive being coupled to the hob-driving gears via a differential gear system. Such a prior-art machine is described for example in the German patent application No. DD-WP 134 926 and is designed in such a manner that the indexing and differential change gears and the differential system are arranged in the machine stand at the side thereof facing the hob carriage and the drive elements in the branches of the feed drive system for the axial and tangential drives are arranged immediately in the hob carriage. A gear train connection leads from the branch of the feed drive in the hob carriage and is coupled via differential change gears for the differential system in the stand and therefrom a part of the hob driving gears is coupled via indexing change gears to the workpiece clamping table and another part of the hob driving gears is connected to the tool.

Even if by means of this known arrangement employing a branch of the feed driving gears in a hob carriage for the axial and tangential feed results in a very short gear trains having respectively a small number of gear elements the location of the differential system and of the differential and indexing change gears in the machine stand still produces several substantial disadvantages.

One of these disadvantages is the fact that relatively long parts are necessary in respective gear trains. As a consequence, the rigidity of the gear system and thus the attainable accuracy of the resulting product is negatively influenced. In addition, in order to install the gear elements in the machine stand there are needed gear boxes which in turn require large openings and spaces in this important component part of the machine. As a result, apart from increased costs for material and machining work, the stability of the machine tool is adversely affected. Moreover, due to the widely separated arrangement of the differential and indexing change gears and of the branch gears of the feed drive no central servicing is possible.

SUMMARY OF THE INVENTION

It is therefore a general object of the present invention to overcome the aforementioned disadvantages.

More particularly, it is an object of the present invention to provide an improved hobbing machine in which the cost for the construction of the hob-driving gear system and its connection to the feed drive system is reduced.

Another object of this invention is to provide such an improved hobbing machine in which the accuracy of the manufactured gears is increased.

A further object of the invention is to provide an improved hobbing machine of the aforedescribed type in which the differential and indexing change gears are so arranged in the machine as to enable a central control or servicing by the driving gear system for the hob and a very short coupling gear train between the feeding drive system and the hob-driving system.

In keeping with these objects, and others which will become apparent hereafter, one feature of the invention resides in arranging the differential system and the differential change gears in the movable hob carriage whereas the indexing change gears are arranged in the housing for the work fixing table.

Another feature of this invention resides in locating the differential gear system in the hob carriage below the swivel axis of the swivel head and a separate motor for this is located immediately on the hob carriage.

By virtue of this particular arrangement of the differential gear system in the stand and in the work table housing of the machine a very short hob-driving gear train will result and due to the provision of a separate motor for the feed drive a very short connection between the feed drive and the hob drive is also attained. As a result, the number of gear train elements is reduced and the corresponding casings for accommodating the gear trains have a smaller size. At the same time, the rigidity of respective gear trains as well as of the machine stand is increased and consequently the noises are reduced and the accuracy of hobbing operations is improved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

Figure 1:
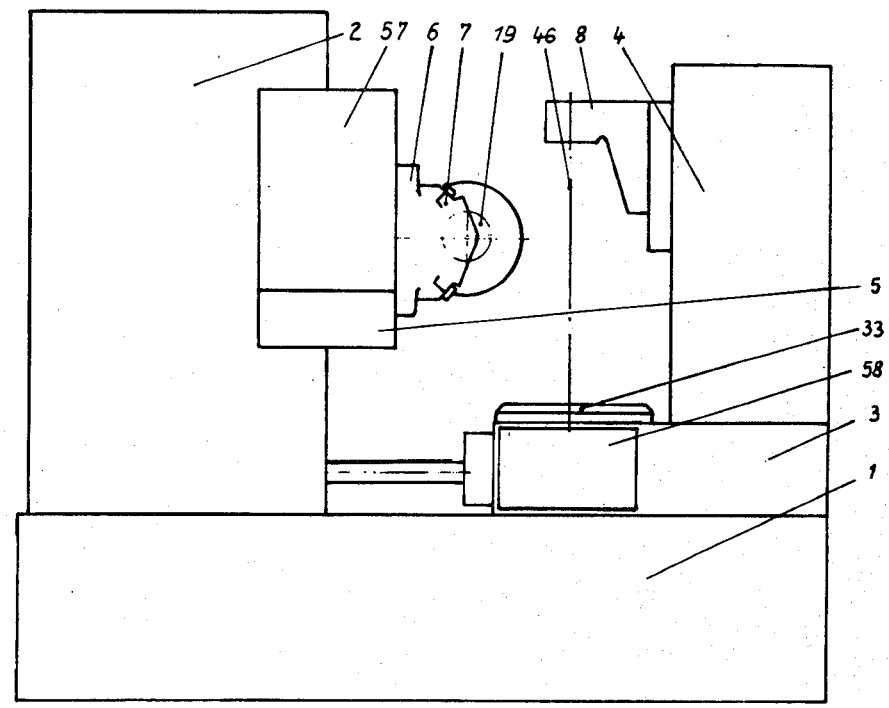
FIG. 1 is a simplified front view of the hobbing machine of this invention.

Referring to FIG. 1, the machine base or bench 1 supports at one side a tool column or stand 2 and at the opposite side a work table housing 3. The housing 3 encloses also an auxiliary column or stand 4. The main or tool stand 2 is adapted for supporting a vertically adjustable hob carriage 5 which in turn supports a swivel head 6 provided with a hob slide 7 which is movable in a tangential direction relative to a workpiece. The auxiliary stand 4 is provided with an outer support 8 for centering the workpiece.

The vertically displaceable hob carriage 5 (FIG. 2) encloses a non-illustrated main driving motor which drives via a shaft 9 a spur gear 10 of the hob-driving gear system. This system further includes a spur gear 12 engaging the gear 10 and being connected by means of a shaft 11 to the swivel head 6 which includes bevel gears 13 and 14, and the hub slide 7 constituted by shaft 15 splined to a bevel gear 14, meshing spur gears 16 and 17 for coupling shaft 15 to hob spindle 18 and a hob 19 mounted on spindle 18. In addition, spur gear 12 is also in mesh with a spur gear 13 which drives via a differential 21 a transmission gear train including bevel gears 22 and 33, shaft 24, another pair of bevel gears 25 and 26 located in the machine stand 2, a shaft 27 which connects bevel gear 26 to a gear system which is located in the work table housing 3. The latter gear system includes a reversing gear unit 28, indexing change gears 29, which are connected via shaft 30 to an indexing worm 31 engaging an indexing worm gear 32 which in turn drives clamping work table 32 to rotate about the workpiece axis 46.

The hob carriage 5 further supports a separate drive motor 34 connected to a feed drive gear system including a pair of bevel gears 35 and 36, a shaft 37, a reversing gear unit 38 and a differential change gear 39 which are coupled via the differential 21 to the hob-driving gear system. The shaft 37 rotates spur gear 40 which is in engagement with an interchangeable spur gear 41 serving for adjusting either the axial feed or the tangential feed. In the first case, the interchangeable gear 41 is connected to a shaft 42 to drive via a worm 43 a worm gear 44 which is formed as a spindle nut in mesh with an axial feed spindle 45 which is mounted on the machine stand 2 and extends parallel to the axis 46 of the workpiece. In this manner, when the interchangeable gear 41 is mounted on the shaft 42 and the motor 34 is actuated, the hob carriage 5 performs an axial movement parallel to the workpiece axis 46. If the interchangeable gear 41 is mounted on shaft 47 of the tangential branch of the feed driving gear system, a pair of bevel gears 48 and 49, meshing spur gears 50, 51 and 52, a shaft 53 and a worm 54 drives a worm gear 55 which is again formed as a spindle nut engaging a spindle 56 rigidly connected to the slide 7 so that the latter is moved in tangential direction transversely to the axis 46 of the workpiece. In this manner, tangential feed of the hob 19 is generated.

Figure 2:
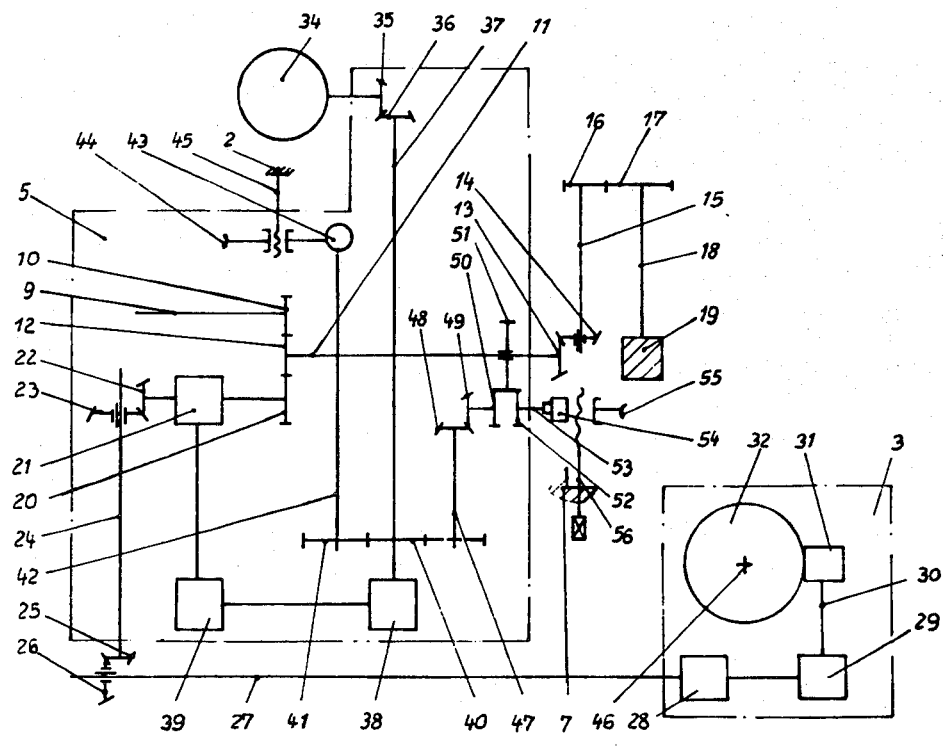
FIG. 2 is a schematic representation of the arrangement of gear systems in the machine of FIG. 1 including the hob-driving gear train and the feed gears.

In FIG. 2 by dash and dot lines is indicated which gear systems are located in carriage 5 and which in the housing 3 for the work table. Differential change gears 39, reversing gear 38 and the interchangeable gear 41 for selecting the axial or tangential feed are accessible through doors 57 in the hob carriage 5. Similar door 58 is provided in the work table housing 3 to render access to indexing change gear 29 and to the reversing gears 28.

It will be understood that each of the elements described above, or two or more together, may also find a useful application in other types of constructions differing from the types described above.

While the invention has been illustrated and described as embodied in a hobbing machine for manufacturing spur gears and worm gears, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hobbing machine for manufacturing spur gears or worm gears, comprising a table housing including a work table rotatable about an axis, an indexing gear system for driving said table; a stationary stand spaced apart from said table housing; a carriage supported on said stand for movement parallel to said axis; a hob slide arranged on said carriage for movement transversely to said axis and supporting a hob spindle; said carriage further including a hob driving gear system driven by a motor and being coupled to said hob spindle, a feed driving system driven by a separate motor and being selectively connected to said stand for feeding said carriage in the axial direction or to said slide to feed the same in said transverse direction, and a differential system coupled to said hob driving system and including a differential and differential change gears for coupling said hob driving system to said feed driving system; and said indexing gear system including indexing change gears arranged in said work table housing and being coupled to said differential system via transmission means arranged in said stand.

2. A hobbing machine as defined in claim 1, further including a swivel head arranged on said hob carriage for supporting said hob slide, said swivel head being adjustable about a swivel axis, and said differential system being located below said swivel axis.

3. A hobbing machine as defined in claim 2, wherein said hob driving gear system includes a connection shaft coinciding with said swivel axis.

* * * * *